(12) United States Patent
Watanabe et al.

(10) Patent No.: US 9,275,287 B2
(45) Date of Patent: Mar. 1, 2016

(54) DRIVING ASSISTANCE DEVICE

(75) Inventors: Takashi Watanabe, Saitama (JP); Kei Oshida, Saitama (JP); Haruhiko Nishiguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 287 days.

(21) Appl. No.: 14/123,631

(22) PCT Filed: Mar. 13, 2012

(86) PCT No.: PCT/JP2012/056448
§ 371 (c)(1),
(2), (4) Date: Dec. 3, 2013

(87) PCT Pub. No.: WO2012/172842
PCT Pub. Date: Dec. 20, 2012

(65) Prior Publication Data
US 2014/0092237 A1     Apr. 3, 2014

(30) Foreign Application Priority Data

Jun. 13, 2011   (JP) .................................. 2011-131454
Jun. 13, 2011   (JP) .................................. 2011-131455

(51) Int. Cl.
| | |
|---|---|
| *B60R 1/00* | (2006.01) |
| *G06K 9/00* | (2006.01) |
| *G08G 1/16* | (2006.01) |
| *H04N 7/18* | (2006.01) |

(52) U.S. Cl.
CPC .............. *G06K 9/00798* (2013.01); *B60R 1/00* (2013.01); *G08G 1/166* (2013.01); *G08G 1/167* (2013.01); *B60R 2300/105* (2013.01); *B60R 2300/305* (2013.01); *B60R 2300/307* (2013.01); *B60R 2300/8086* (2013.01); *H04N 7/183* (2013.01)

(58) Field of Classification Search
None
See application file for complete search history.

(56) References Cited

FOREIGN PATENT DOCUMENTS

| | | |
|---|---|---|
| JP | 2006-051850 A | 2/2006 |
| JP | 2008-260336 A | 10/2008 |
| JP | 2010-012904 A | 1/2010 |
| JP | 2010-018102 A | 1/2010 |
| JP | 2010012904 A * | 1/2010 |
| JP | 2010-039953 A | 2/2010 |

\* cited by examiner

*Primary Examiner* — Dave Czekaj
*Assistant Examiner* — Nam Pham
(74) *Attorney, Agent, or Firm* — Carrier Blackman & Associates, P.C.; Joseph P. Carrier; William D. Blackman

(57) ABSTRACT

An indication control unit 11 indicates a side-rearward image of a vehicle 1 captured by a left-rearward camera 2L and a right-rearward camera 2R mounted on the vehicle 1, after superimposing guidelines showing a guide of a distance from the vehicle 1, to a left-rearward indicator 3L and a right-rearward indicator 3R. A road shape recognizing unit 13 recognizes a shape of a road on which the vehicle is traveling. When it is recognized by the road shape recognizing unit 13 that the vehicle 1 is traveling on the road of a predetermined shape, the indication control unit 11 sets the guidelines to non-display, or sets an indicating position of the guidelines according to the shape of the road recognized by the road shape recognizing unit 13.

9 Claims, 13 Drawing Sheets

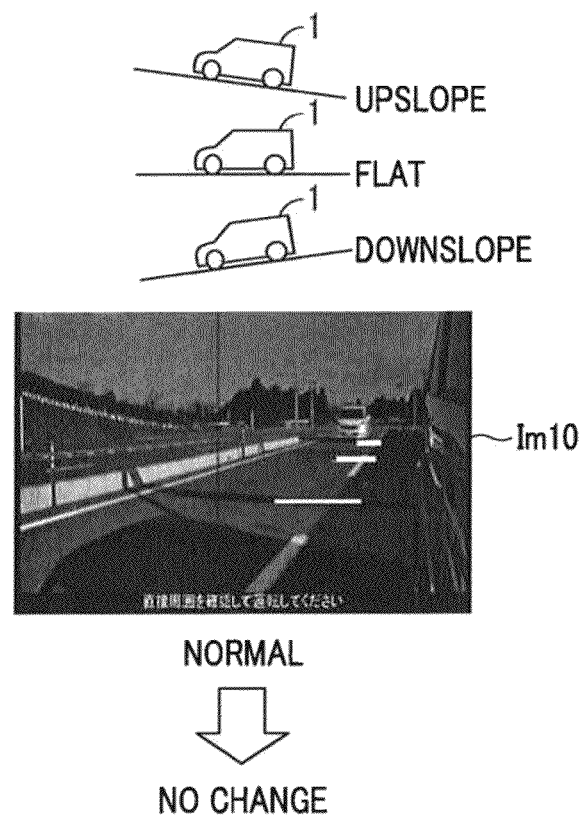

FIG.6A
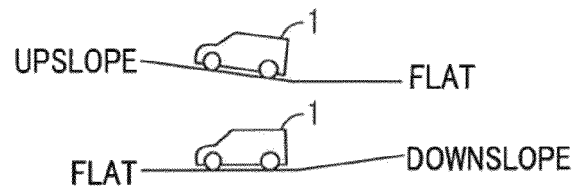
GUIDELINE INDICATED TO CLOSE DISTANCE
FIG.6B
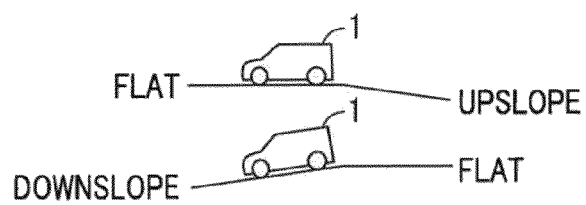
GUIDELINES INDICATED FAR

DRIVING ASSISTANCE DEVICE

TECHNICAL FIELD

The present invention relates to a driving assistance device which indicates a side-rearward image of a self-vehicle captured by a camera to an indicator provided in a vicinity of a driver's seat.

Conventionally, there is proposed a driving assistance device which makes it easy for a driver to recognize existence of other vehicles traveling rearward of the self-vehicle, during a right or left turn or a lane change, by indicating a side-rearward image of the self-vehicle captured by a camera to an indicator provided in a vicinity of a driver's seat such as a dashboard and the like (for example, refer to Patent Literature 1).

Further, there is proposed a driving assistance device which makes it easy for the driver to grasp a distance between the self-vehicle and other vehicle, by indicating a guideline showing a position rearward by a predetermined distance from the self-vehicle in an adjacent lane, when indicating the side-rearward image of the self-vehicle on the indicator (for example, refer to Patent Literature 2).

CITATION LIST

Patent Literature

Patent Literature 1: Japanese Patent Application Laid-Open No. 2008-260336

Patent Literature 2: Japanese Patent Application Laid-Open No. 2006-51850

SUMMARY OF INVENTION

Technical Problem

In the conventional driving assistance device, the position of the guideline to be superimposed on the display of the indicator is made to a fixed position assuming a certain distance from the self-vehicle. However, the present inventors have found that there are cases where the indication of the guideline becomes inappropriate to the driver, when the indicating position of the guideline is set as explained above, depending on a traveling condition of the self-vehicle.

The present invention has been made in view of such background, and aims to provide a driving assistance device which prevents the indication of the guideline from becoming inappropriate to the driver, when the side-rearward image of the self-vehicle is indicated to the indicator with the guideline superimposed thereon.

Solution to Problem

In order to achieve the above-mentioned object, the present invention relates to an improvement of driving assistance device equipped with an indication control unit which indicates an image of a side-rearward of a vehicle captured by a camera mounted on the vehicle with a guideline showing a guide of a distance from the vehicle superimposed thereon, to an indicator mounted on the vehicle.

Further, the driving assistance device is equipped with a road shape recognizing unit which recognizes a shape of a road on which the vehicle is traveling, wherein, when it is recognized by the road shape recognizing unit that the shape of the road on which the vehicle is traveling is a predetermined shape, the indication control unit sets the guideline to non-display or sets an indicating position of the guideline in line with the shape of the road recognized by the road shape recognizing unit (a first aspect of the invention).

In the first aspect of the invention, when the vehicle is traveling on a straight flat road, it becomes possible to make the driver correctly recognize the distance to the other vehicle and the like existing at side-rearward of the vehicle, by indicating the guideline to a fixed position of the indicator. However, when the guideline is indicated on the indicator to the fixed position assuming the straight flat road, and when the vehicle is traveling on the road of the predetermined shape, such as a curved road or a road with a changing gradient, a deviation between the position of the image of the road and the indicating position of the guideline on the indicator becomes larger.

Therefore, when the shape of the road on which the vehicle is traveling is recognized as the predetermined shape by the road shape recognizing unit, the indicator control unit sets the guideline to non-display, or sets the indicating position of the guideline in line with the shape of the road recognized by the road shape recognizing unit. By doing so, it becomes possible to prevent the indication of the guideline from becoming inappropriate for the driver.

Further, in the first aspect of the invention, it is preferable that the predetermined shape is a shape of a curved road with a curvature equal to or more than a first predetermined value, or a shape of a road of a traveling path during a right-turn or a left-turn of an intersection (a second aspect of the invention).

According to the second aspect of the invention, when the vehicle is turning at a large curvature, it becomes possible to prevent the indication of the guideline from becoming inappropriate for the driver, by setting the indication of the guideline to non-display, or setting the indicating position of the guideline in line with the curvature of the road.

Further, in the first aspect of the invention or the second aspect of the invention, it is preferable that the predetermined shape is a shape of a road with a gradient change rate equal to or more than a second predetermined value (a third aspect of the invention).

According to the third aspect of the invention, when the vehicle is traveling a road with a large change of gradient, it becomes possible to prevent the display of the guideline from becoming inappropriate for the driver, from a variation of a relationship between the indicating position of the guideline and a distance from the vehicle, by setting the display of the guideline to non-display, or set the indicating position of the guideline in line with the gradient change rate.

Further, in any one of the first aspect of the invention through the third aspect of the invention, it is preferable that the driving assistance device further includes a brightness detecting unit which detects a brightness of surroundings of the vehicle, and a side-rearward object detecting unit which detects an other vehicle existing at side-rearward of the vehicle, based on the captured image of the camera, and wherein when the brightness of the surroundings of the vehicle detected by the brightness detecting unit is equal to or less than a predetermined level, the indication control unit indicates the guideline only when the other vehicle is being detected by the side-rearward object detecting unit, and sets the guideline to non-display when the other vehicle is not being detected by the side-rearward object detecting unit (a fourth aspect of the invention).

In the fourth aspect of the invention, when the guideline is indicated in a situation where the surroundings of the vehicle is dark, such as at nighttime or during tunnel traveling, and the indication display of the indicator is dark, only the guideline is emphasized in the indication display where even white lines of the road is not visible, thereby giving discomfort to the driver.

Therefore, when the brightness of the surroundings of the vehicle detected by the brightness detecting unit is equal to or less than the predetermined level, the indication control unit displays the guideline only when the other vehicle is detected by the side-rearward object detecting unit, and sets the guideline to non-display when no other vehicle at side-rearward is detected by the side-rearward object detecting unit. By doing so, it becomes possible to prevent giving discomfort to the driver, by emphasizing only the guideline in the indicator during nighttime and the like.

Further, it is preferable that the driving assistance device further includes a luminance change detecting unit which detects that a luminance of a luminance detecting region set so as to include an image portion of a road side is changing periodically, for a side-rearward image of the vehicle captured by the camera during traveling of the vehicle, wherein, when it is detected by the luminance change detecting unit that the luminance of the luminance detecting region is changing periodically, the indication control unit performs a gradation process of decreasing a luminance difference between pixels in the luminance detecting region to the image, and indicates the image performed with the gradation process to the indicator (a fifth aspect of the invention).

In the fifth aspect of the invention, when power poles or street lamps are aligned along the road, or when plants are growing gregariously, at the side of the road on which the vehicle is traveling, the luminance of the image portion of the road side in the side-rearward image of the vehicle captured by the camera changes periodically. In such case, when the captured images of the camera are indicated in the indicator directly, flickering of the screen becomes large and becomes an indication annoying for the driver.

Therefore, in the fifth aspect of the invention, when it is detected by the luminance change detecting unit that the luminance of the luminance detecting region is changing periodically, the indication control unit displays the image to the indicator, after performing the gradation process of decreasing the luminance difference between the pixels in the luminance detecting region. By doing so, it becomes possible to reduce the flickering of the image indicated in the indicator, and to avoid the annoying indication for the driver from being made.

Further, in the fifth aspect of the invention, it is preferable that the luminance detecting region is set to a shape in which a length in a first direction corresponding to a vertical direction of the vehicle is longer than a length in a second direction corresponding to a horizontal direction of the vehicle (a sixth aspect of the invention).

According to the sixth aspect of the invention, by setting the luminance detecting region to the shape elongated in the first direction corresponding to the vertical direction of the vehicle, it becomes possible to make it easy to detect the periodic change of the luminance when the objects extending vertically from the road, such as the power poles and street lamps aligned along the road side, are captured by the camera.

Further, in the fifth aspect of the invention, it is preferable that the indication control unit performs the gradation process, when the pixels with the luminance changing periodically within the luminance detecting region are distributed toward a vanishing point in which an image portion of the road vanishes in a direction corresponding to rearward of the vehicle (a seventh aspect of the invention).

According to the seventh aspect of the invention, it becomes possible to make it easy to detect the periodic change of the luminance from the plant growing gregariously at the road side being captured continuously by the camera.

Further, in any one of the fifth aspect of the invention to the seventh aspect of the invention, it is preferable that the driving assistance device further includes a road situation detecting unit which detects a situation of the road on which the vehicle is traveling, wherein, when the vehicle is traveling on a road having a plurality of traffic lanes, the indication control unit performs a gradation process limited to a case where the vehicle is traveling on a leftmost or a rightmost traffic lane (an eighth aspect of the invention).

According to the eighth aspect of the invention, the gradation process is prevented from being performed, in a situation where the power poles and the like at the road side as a cause of flickering of the display of the indicator are not captured, a situation where the range of the image portion of the road side captured is narrow, or a situation where a traveling speed of the captured power poles and the like on the display is slow, and the like. Therefore, a calculation load from performing the gradation process may be reduced.

Further, in any one of the fifth aspect of the invention through the eighth aspect of the invention, it is preferable that the luminance change detecting unit detects whether or not the luminance is changing periodically for each pixel in the luminance detecting region, and the indication control unit performs the gradation process limited to a case where a proportion of the pixels in which the luminance is changing periodically to total pixels of the luminance detecting region is equal to or more than a predetermined value (a ninth aspect of the invention).

According to the ninth aspect of the invention, the gradation process by the indication control unit is performed, limited to a case where the proportion of the pixels generating periodic luminance change is high, and it is assumed that flickering becomes large when indicated in the indicator. Therefore, the calculation load from performing the gradation process may be reduced.

Further, in any one of the fifth aspect of the invention through the ninth aspect of the invention, it is preferable that the indication control unit performs, as the gradation process, a process of decreasing a contrast of the luminance detecting region, or changing a maximum luminance of each pixel in the luminance detecting region to equal to or less than a predetermined upper limit luminance (a tenth aspect of the invention).

According to the tenth aspect of the invention, it becomes possible to easily decrease the luminance change within the luminance detecting region.

Further, in any one of the fifth aspect of the invention through the tenth aspect of the invention, it is preferable that the driving assistance device further includes an acceleration-deceleration detecting unit which detects an acceleration-deceleration of the vehicle, wherein the luminance change detecting unit sets a standard period for detecting that the luminance is changing periodically, based on the acceleration-deceleration of the vehicle (an eleventh aspect of the invention).

According to the eleventh aspect of the invention, it becomes possible to make it easy to detect the pixels of the luminance detecting region with the luminance changing periodically, by setting the standard period according to a moving speed of the image portions of the power poles and roadside trees and the like at the road side, in the time-series captured images of the camera which varies according to the change of the traveling speed of the vehicle.

BRIEF DESCRIPTION OF THE DRAWINGS

FIG. 5 is an explanatory view of guideline indication on a road with constant gradient;

FIGS. 6A and 6B are explanatory views of the guideline indication on a road with gradient change;

DESCRIPTION OF EMBODIMENTS

Embodiments of a driving assistance device of the present invention will be explained with reference to FIG. 1 through FIG. 13. With reference to FIG. 1, the driving assistance device (refer to FIG. 2) of the present embodiment is used by being mounted on a vehicle 1, and displays a left-rearward image ImL of the vehicle captured by a left-rearward camera 2L (corresponds to a camera of the present invention) mounted on a left door mirror of the vehicle 1, to a left-rearward indicator 3L (corresponds to an indicator of the present invention) provided in a dashboard.

Similarly, the driving assistance device indicates a right-rearward image ImR of the vehicle 1 captured by a right-rearward camera 2R (corresponds to the camera of the present invention) mounted on a right door mirror of the vehicle 1, to a right-rearward indicator 3R (corresponds to the indicator of the present invention) provided in a dashboard.

Figure 1A:
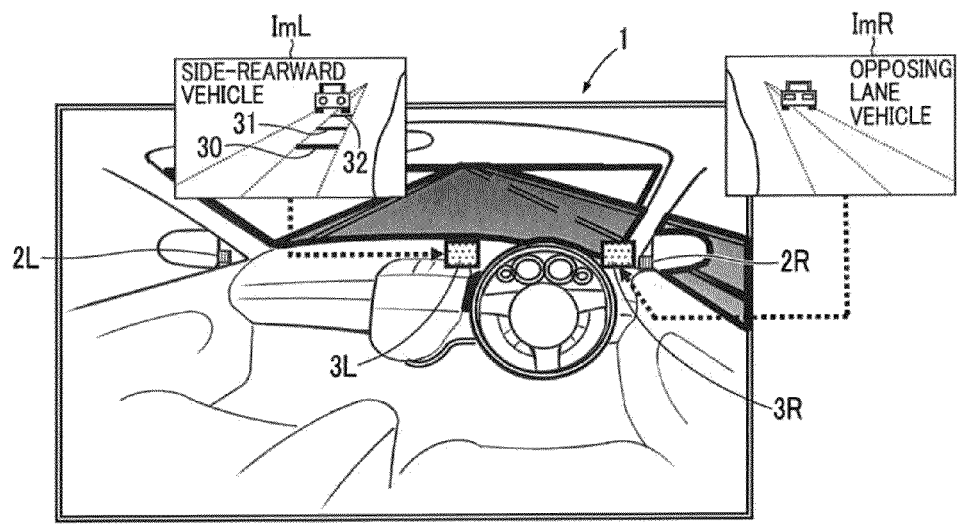
FIGS. 1A and 1B are explanatory views of usage conditions of a driving assistance device.
Figure 1B:
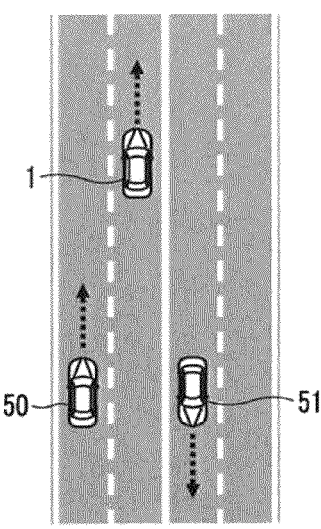

The images ImL, ImR of FIG. 1A are, as is shown in FIG. 1B, images captured by the left-rearward camera 2L and the right-rearward camera 2R, in a situation where a following vehicle 50 is traveling left-rearward of the vehicle (self-vehicle) 1, and a vehicle 51 which passed the vehicle 1 is traveling on an opposing lane at right-rearward of the vehicle 1. In the image ImL, guidelines 30, 31, and 32, that serve as a guide for distance from the vehicle 1, are superimposed and indicated on the captured image of the left-rearward camera 2L.

Figure 2:
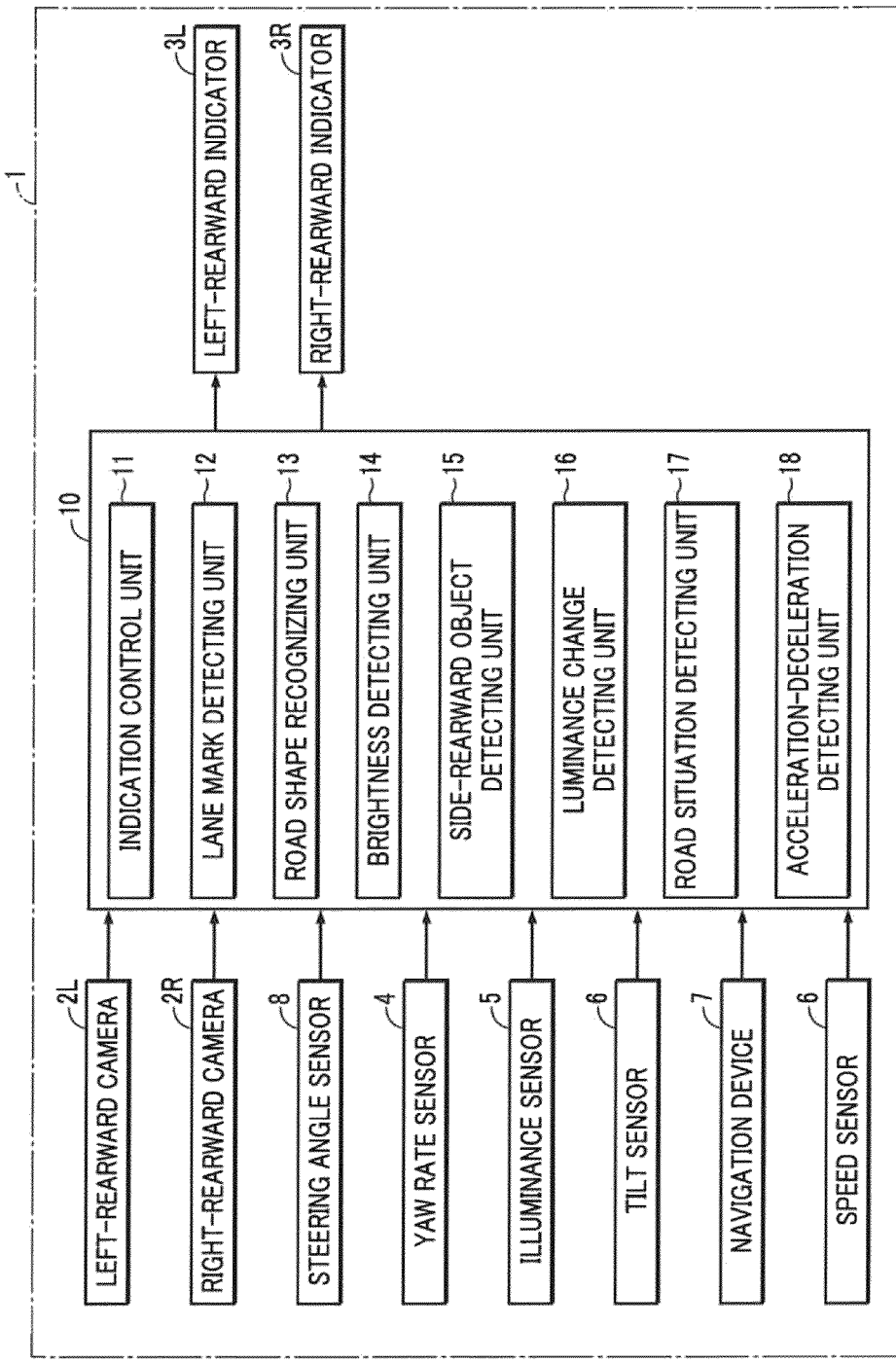
FIG. 2 is a view showing a configuration of the driving assistance device.

Next, with reference to FIG. 2, a driving assistance device 10 is input with captured signals from the left-rearward camera 2L and the right-rearward camera 2R, a detected signal of a steering angle of a steering from a steering angle sensor 8, a detected signal of a yaw rate of the vehicle 1 from a yaw rate sensor 4, a detected signal of an illuminance of surroundings of the vehicle 1 by an illuminance sensor 5, a detected signal of a tilt of the vehicle 1 in a front-back direction by a tilt sensor 6, and a detected signal of a travel speed of the vehicle 1 by a speed sensor 9.

The driving assistance device 10 recognizes a position (a present position and a position on a map) of the vehicle 1, by a communication with a navigation device 7. Further, the driving assistance device 10 outputs an indication data on the left-rearward indicator 3L and the right-rearward indicator 3R.

The driving assistance device 10 is an electronic unit configured from a CPU, a memory and the like, and by executing a control program for driving assistance stored in the memory by the CPU, functions as an indication control unit 11 which controls an indication of the left-rearward indicator 3L and the right-rearward indicator 3R, a lane mark detecting unit 12 which detects a lane mark (white lines and the like) provided on a road, on the basis of the captured images of the left-rearward camera 2L and the right-rearward camera 2R, a road shape recognizing unit 13 which recognizes a shape of the road on which the vehicle 1 is traveling, a brightness detecting unit 14 which detects a brightness of the surroundings of the vehicle 1 on the basis of the detected signals of the illuminance sensor 5, a side-rearward object detecting unit 15 which detects an object (other vehicles and the like) existing at side-rearward of the vehicle 1 on the basis of the captured images of the left-rearward camera 2L and the right-rearward camera 2R, a luminance change detecting unit 16 which detects a periodic luminance change of the captured images of the left-rearward camera 2L and the right-rearward camera 2R, a road situation detecting unit 17 which detects a situation of the road on which the vehicle 1 is traveling, and an acceleration-deceleration detecting unit 18 which detects an acceleration and deceleration of the vehicle 1.

[Control of Indication Manner of Guidelines]

The driving assistance device 10 recognizes the shape of the road on which the vehicle 1 is traveling, and controls an indication manner of the guidelines to the left-rearward indicator 3L and the right-rearward indicator 3R according to the shape of the road. Hereinafter, explanation will be given on the control, in line with the flowchart shown in FIG. 3. The driving assistance device 10 repeatedly executes a process of the flowchart shown in FIG. 3, in each predetermined control cycle.

Figure 3:
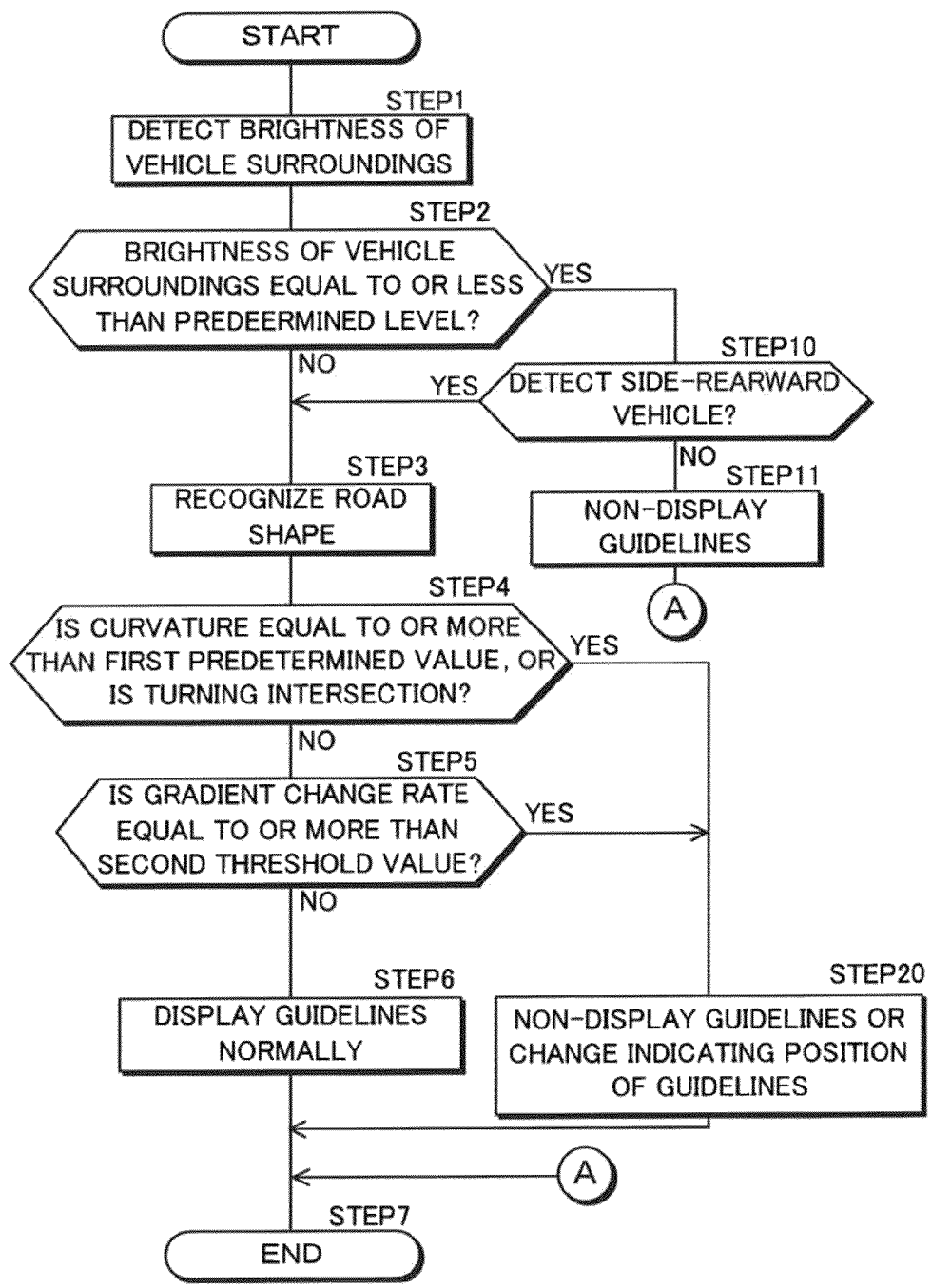
FIG. 3 is a flowchart of a process of indicating guidelines.

STEP1 in FIG. 3 is a process by the brightness detecting unit 14. The brightness detecting unit 14 detects the brightness of the surroundings of the vehicle 1, on the basis of the detected signal of the illuminance by the illuminance sensor 5. Subsequent STEP2 is a process by the indication control unit 11, and the indication control unit 11 judges whether or not the brightness of the surroundings of the vehicle 1 is equal to or less than a predetermined level (which is set supposing a brightness at nighttime or during tunnel traveling).

When the brightness of the surroundings of the vehicle 1 is equal to or less than the predetermined level, the process branches to STEP10, and when the brightness of the surroundings of the vehicle 1 exceeds the predetermined level, the process proceeds to STEP3. STEP3 is a process by the road shape recognizing unit 13.

The road shape recognizing unit 13 recognizes the shape of the road (a curvature, an intersection, a gradient change rate and the like, corresponds to a predetermined shape of the present invention) on which the vehicle 1 is travelling, from the information of the road on which the vehicle 1 is traveling transmitted from the navigation device 7, the steering angle of the steering obtained from the detected signal of the steering angle sensor 8, the yaw rate of the vehicle 1 obtained from the detected signal of the yaw rate sensor 4, the gradient of the road obtained from the detected signal of the tilt sensor 6, and the shape of the lane mark of the road detected by the lane mark detecting unit 12.

Subsequent STEP4 through STEP6 and STEP20 branched from STEP4 are process by the indication control unit 11. In STEP4, the indication control unit 11 judges whether or not the curvature of the road on which the vehicle 1 is traveling is equal to or more than a first predetermined value, or whether or not the vehicle 1 is turning the intersection.

Then, when the curvature of the road on which the vehicle 1 is traveling is equal to or more than the first predetermined value, or when the vehicle 1 is turning the intersection, the process branches to STEP20. In STEP20, the indication control unit 11 sets the guidelines to non-display, or sets an indicating position of the guidelines in accordance with the shape of the road.

Figure 4A:
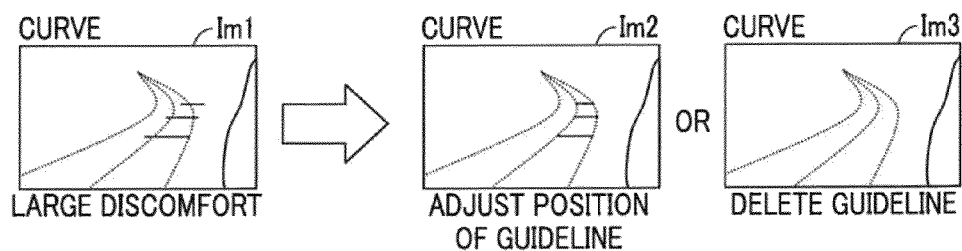
FIGS. 4A and 4B are explanatory views of a guideline indication for a curved road.

FIG. 4A shows an indication state of the left-rearward indicator 3L when the vehicle 1 is traveling on a curved road with large curvature (equal to or more than the first predetermined value), and Im1 indicates the guidelines superimposed on a position assuming a straight flat road. In this case, since a displacement between the guidelines and the shape of the road becomes large, there is a fear that it becomes an inappropriate display of guidelines bringing discomfort to a driver viewing Im1.

Figure 4B:
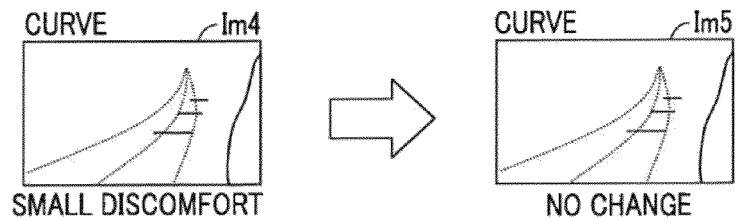

Further, FIG. 4B shows a display of the left-rearward indicator 3L when the vehicle 1 is traveling on the curved road with small curvature (less than the first predetermined value), and Im4 indicates the guidelines superimposed on the position assuming the straight flat road. In this case, the displacement between the guidelines and the shape of the road is small, so that it is supposed that it does not bring discomfort to the driver viewing Im4.

Therefore, when the curvature is equal to or more than the first predetermined value, it becomes possible to prevent the inappropriate guidelines for the driver from being displayed, by setting the indicating position of the guidelines in accordance with the shape of the road as is shown in Im2 of FIG. 4A, or by setting the guidelines to non-display as is shown in Im3. Further, when the curvature is less than the first predetermined value, the guidelines may be superimposed on an ordinary position assuming the straight flat road, as is shown in Im5 of FIG. 4B.

In STEP4, when the curvature of the road on which the vehicle 1 is traveling is less than the first predetermined value, and when the vehicle 1 is not turning the intersection, then the process proceeds to STEP5. In STEP5, the indication control unit 11 judges whether or not the gradient change rate of the road on which the vehicle 1 is traveling is equal to or more than a second predetermined value.

Thereafter, when the gradient change rate of the road on which the vehicle 1 is traveling is equal to or more than the second predetermined value, the process proceeds to STEP20. In STEP20, the indication control unit 11 sets the guidelines to non-display, or corrects the indicating position of the guidelines so as to correct a distance error from gradient, on the basis of detected signal of the tilt sensor 6.

The non-display of the guidelines, or the correction of the indicating position of the guidelines, are performed from a time when the gradient change rate became equal to or more than the second predetermined value, until after a lapse of a predetermined time after the gradient change rate became approximately zero (for example, set to a time or more until a portion at which the gradient change rate of rearward of the vehicle 1 became equal to or more than the second predetermined value departs from a field of view of the left-rearward camera 2L and the right-rearward camera 2R).

FIG. 5 shows the display Im10 of the left-rearward indicator 3L, when the vehicle 1 is traveling on a road in which the gradient is approximately constant. In this case, the distance of each guideline is normal, so that it is not necessary to set the guidelines to non-display, or perform correction of the displaying position of the guidelines.

On the other hand, as is shown in FIG. 6A, when the road has gradient in an orientation approaching the vehicle 1, at rear of the vehicle 1, the guidelines in the indicated image Im11 of the left-rearward indicator 3L is indicated to a closer range than reality. Therefore, the image gives wrong distance information to the driver.

Further, as is shown in FIG. 6B, when the road has gradient in an orientation departing from the vehicle 1, at rear of the vehicle 1, the guidelines in the indicated image Im12 of the left-rearward indicator 3L is indicated to a farther range than reality. Therefore, the image gives wrong distance information to the driver.

Therefore, by setting the guidelines to non-display, or by correcting the indicating position of the guidelines so as to correct the distance error from gradient, on the basis of the detected signal of the tilt sensor 6, it becomes possible to prevent giving wrong distance information to the driver.

On the other hand, when the gradient change rate of the road on which the vehicle 1 is traveling is less than the second predetermined value, the process proceeds to STEP6, and the indication control unit 11 indicates the guidelines to a fixed position assuming the straight flat road (normal indication of guidelines). Thereafter, the process proceeds to STEP7, and the driving assistance device terminates the process of one control cycle.

Further, in STEP10, the indication control unit 11 judges whether or not the other vehicle at side-rearward of the vehicle 1 is detected by the side-rearward object detecting unit 15. Thereafter, the process proceeds to STEP3 when the other vehicle is being detected, or the process proceeds to STEP11 when the other vehicle is not detected, and the indication control unit 11 sets the guidelines to non-display.

Figure 7:
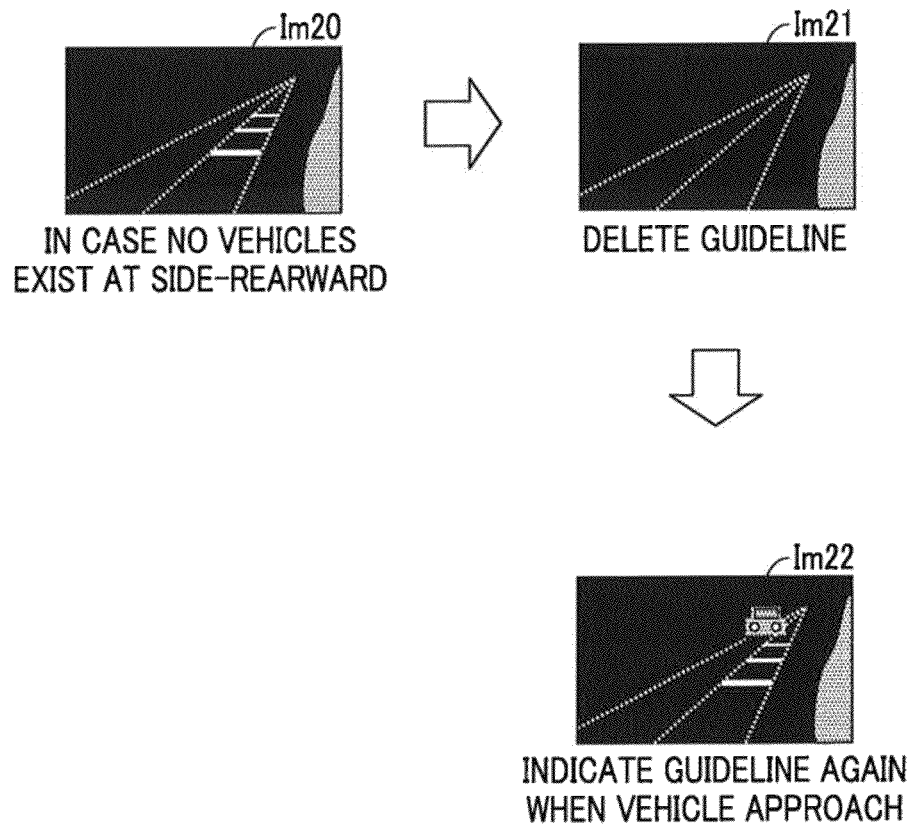
FIG. 7 is an explanatory view of a guideline indication at nighttime.

Im20 in FIG. 7 shows the display of the left-rearward indicator 3L with the guidelines indicated, at nighttime (a situation when the brightness of the surroundings of the vehicle 1 is equal to or less than the predetermined level), and when no vehicles exist at left-rearward of the vehicle 1. In Im20, only the guidelines are emphasized, in a situation where a background is dark, and the white lines on the road is hardly visible, so that there is a fear that the display brings discomfort to the driver viewing Im20.

Therefore, as is shown in Im21 in FIG. 7, by setting the guidelines to non-display, it becomes possible to prevent bringing discomfort to the driver from emphasized indication of the guidelines. Thereafter, when the object (other vehicle and the like) existing at left-rearward of the vehicle 1 is detected by the side-rearward object detecting unit 15, it becomes possible to direct attention of the driver, by indicating the guidelines, as is shown in Im22.

In the present embodiment, a configuration in which the left-rearward camera 2L capturing the left-rearward of the vehicle 1 and the left-rearward indicator 3L indicating the captured image thereby, and the right-rearward camera 2R capturing the right-rearward of the vehicle 1 and the right-rearward indicator 3R indicating the captured image thereby, is shown. However, the present invention may be applied and the effect thereof may be obtained, to a configuration equipped with the camera capturing at least either one of the left-rearward and the right-rearward of the vehicle 1, and the indicator indicating the captured image of the camera.

Further, in the present embodiment, the road shape recognizing unit 13 recognized the shape of the road (the curvature, the intersection, the gradient change rate and the like) on which the vehicle 1 is traveling, from the information of the road on which the vehicle 1 is traveling transmitted from the navigation device 7, the steering angle of the steering obtained from the detected signal of the steering angle sensor 8, the yaw rate of the vehicle 1 obtained from the detected signal of the yaw rate sensor 4, the gradient of the road obtained from the detected signal of the tilt sensor 6, and the shape of the lane mark of the road detected by the lane mark detecting unit 12. However, it is not necessary to recognize the shape of the road using all of such information, and may recognize the shape of the road from various combinations of the information.

Further, in the present embodiment, as the predetermined shape of the road of the present invention, the shape by the curvature of the road, the intersection, and the gradient change rate are given. Other than the above, the setting of the non-display and the indicating position of the guidelines may be performed taking a shape by a width of the road or a number of traffic lanes, and the like, as the predetermined shape.

[Gradation Process to Captured Image]

Figure 8:
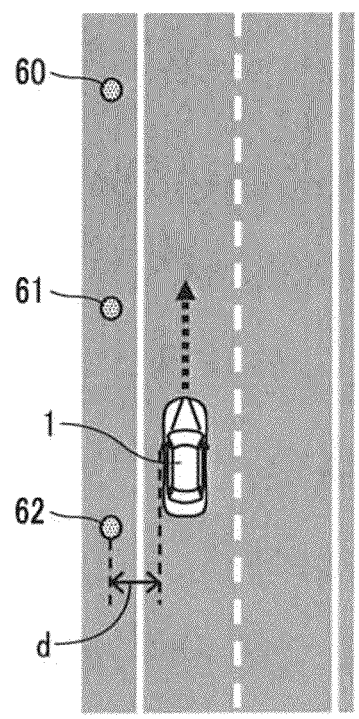
FIG. 8 is an explanatory view of a situation where power poles are aligned at regular intervals along a left end of a road on which a self-vehicle is traveling.

Next, FIG. 8 shows a situation where power poles 60, 61, and 62 are aligned at regular intervals, at left side of the road on which the vehicle 1 is traveling. Under such situation, image portions of the power poles sequentially move (flow) in a horizontal coordinate direction, in time-series captured images of the left-rearward camera 2L.

Thereafter, with the movement of the image portions of the power poles, flickering is generated in the indication of the left-rearward indicator 3L, which gives annoyance to the driver viewing the left-rearward indicator 3L. Since the left-rearward camera 2L and the right-rearward camera 2R are provided at outermost side in a lateral direction of the vehicle 1 and a distance d from existing object at a side of the road is short, the annoyance felt by the driver becomes stronger.

Therefore, when indicating the captured image by the left-rearward camera 2L to the left-rearward indicator 3L, and when indicating the captured image by the right-rearward camera 2R to the right-rearward indicator 3R, the driving assistance device 10 performs a gradation process to these captured images, in order to prevent annoying indication for the driver from being made. A first embodiment and a second embodiment of the gradation process will be explained below.

[First Embodiment of Gradation Process]

First, a first embodiment will be explained pursuant to the flowchart shown in FIG. 9. Explanation will be heretofore given on the captured image of the left-rearward camera 2L. However, similar process is performed by the driving assistance device 10 to the captured image of the right-rearward camera 2R. During traveling of the vehicle 1, the driving assistance device 10 executes the process of flowchart of FIG. 9 in each predetermined control cycle.

Figure 9:
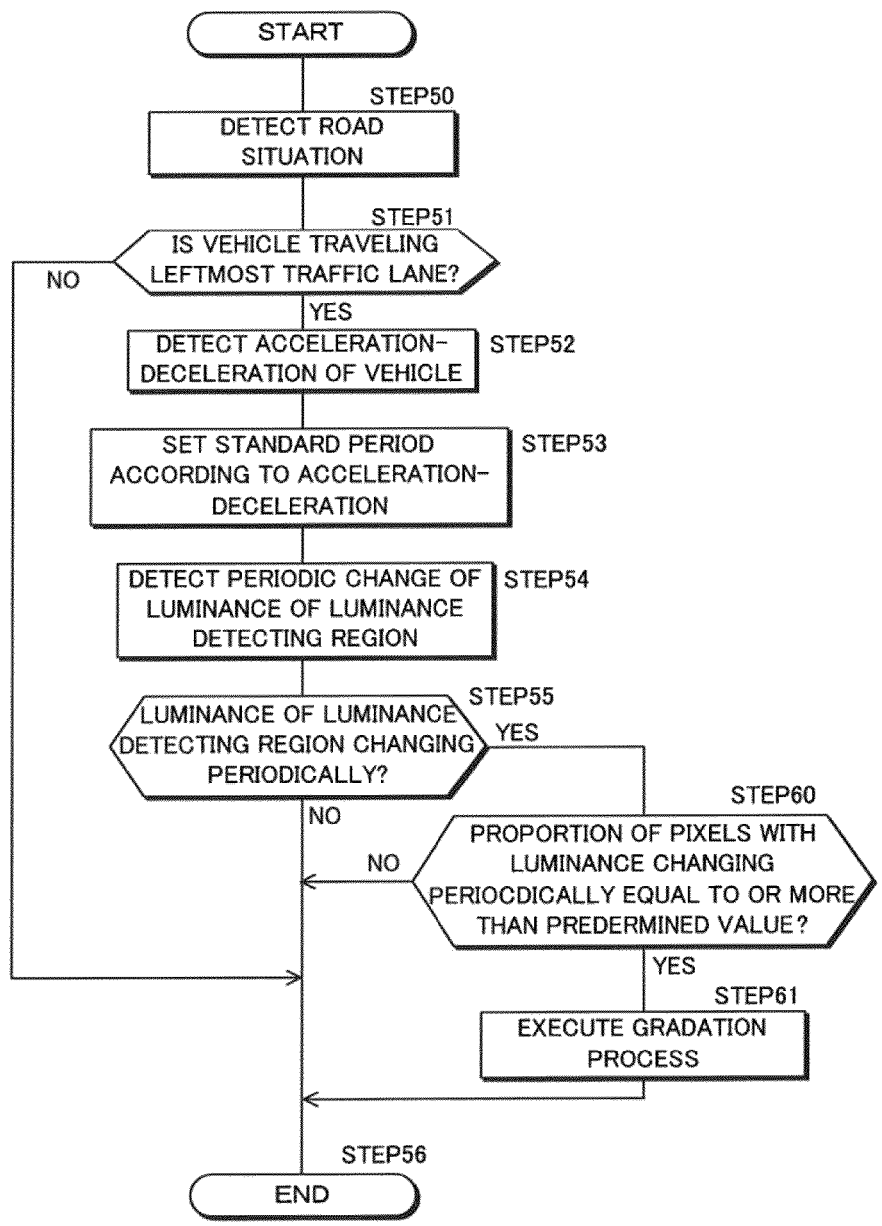
FIG. 9 is a flowchart of a gradation process.

STEP50 of FIG. 9 is a process by the road situation detecting unit 17. The road situation detecting unit 17 detects the situation of the road on which the vehicle 1 is traveling, from data received from the navigation device 7.

Subsequent STEP51 is a process by the indication control unit 11, and the indication control unit 11 judges whether or not the vehicle 1 is traveling on a leftmost traffic lane of a road having a plurality of traffic lanes, from the situation of the road detected by the road situation detecting unit 17. Thereafter, when the vehicle 1 is traveling on the leftmost traffic lane of the road, the process proceeds to STEP52.

On the other hand, when the vehicle 1 is not traveling on the leftmost traffic lane of the road, the captured image of the left-rearward camera 2L does not contain the image portion of the road side, or an area of the image portion of the road side is small, or the traveling speed of the structural objects of the road side in the screen is slow, to that it is not necessary to perform the gradation process. Therefore, the process branches to STEP56 and terminates the process. As is explained above, when the vehicle 1 is traveling on the road having a plurality of traffic lanes, the gradation process is performed exclusively when the vehicle 1 is traveling on the leftmost traffic lane, so that a calculation load of the driving assistance device 10 from performing the gradation process may be reduced.

STEP52 is a process by the acceleration-deceleration detecting unit 18, and the acceleration-deceleration detecting unit 18 detects the acceleration-deceleration of the vehicle 1, from the change in the traveling speed of the vehicle 1 recognized by the speed detecting signal of the speed sensor 9. Subsequent STEP53 through STEP54 are process by the luminance change detecting unit 16.

In STEP53, the luminance change detecting unit 16 sets a standard period for judging a periodic change of the luminance, on the basis of the traveling speed and the acceleration-deceleration of the vehicle 1. The standard period is set to be shorter as the traveling speed of the vehicle 1 becomes faster.

Figure 10:
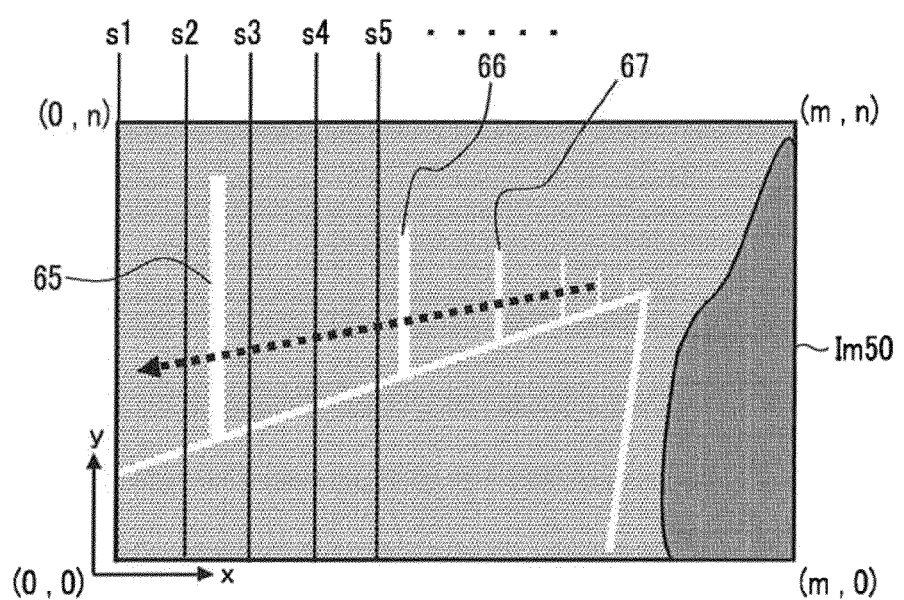
FIG. 10 is an explanatory view of a process of detecting luminance change, in a captured image of a left-rearward camera in the situation shown in FIG. 3.

In STEP54, the luminance change detecting unit 16 sets, as is shown in FIG. 10, vertical lines s1, s2, s3, . . . with a one-pixel width, in the captured image Im1 of the left-rearward camera 2L, as a luminance detecting region. It is preferable to set the luminance detecting region for each horizontal coordinate (x=0, 1, 2, . . . , m) (corresponding to number of lines of horizontal resolution of the left-rearward camera 2L), however, vertical lines with intervals of few pixels therebetween may be set as the luminance detecting region.

The luminance change detecting unit 16 judges, for the time-sequence captured images of the left-rearward camera 2L, whether or not the luminance of the luminance detecting regions s1, s2, s3, . . . of each captured image changes in a period within a set judgment period range taking the standard period as a center thereof.

FIG. 10 is the captured image of the left-rearward camera 2L in the situation shown in FIG. 8, so that the image portions 65, 66, 67, . . . of the power poles extending in a vertical coordinate direction (y direction) move (flow) in the horizontal coordinate direction (x direction). Therefore, by setting the luminance detecting regions s1, s2, s3, . . . elongated in the vertical coordinate direction (y direction), it becomes possible to increase a changing degree of periodic luminance of the luminance detecting region from the existence of the power poles in the road side, and makes it easier to detect the periodic change of the luminance.

The luminance detecting region may not necessarily be a straight line with a one-pixel width and a length of a range of the vertical coordinate (y=0 to m). By setting the length in the vertical coordinate direction (y direction) of the luminance detecting region to be longer than the length in the horizontal coordinate direction (x direction), it becomes possible to make it easier to detect the luminance change of the image portion extending in the vertical coordinate direction.

Subsequent STEP55 and STEP60 through STEP61 are process by the indication control unit 11. The indication control unit 11 judges, in STEP60, whether or not the luminance of each luminance detecting region changes in a period within the judgment period range set taking the standard period as the center thereof. If there is the luminance detecting region with the luminance changing in the period within the judgment period range, then the process branches to STEP60, and if there is no luminance detecting region with the luminance changing in the period within the judgment period range, then the process proceeds to STEP56, and terminates the process.

In STEP60, for the luminance detecting region with the luminance changing in the period within the judgment period range, the indication control unit 11 judges whether or not a proportion of pixels with the luminance changing in the period within the judgment period range to total pixels is equal to or more than a predetermined value. When a luminance detecting region in which the proportion of the pixels with the luminance changing in the period within the judgment period range to the total pixels is equal to or more than a predetermined value (hereinafter referred to as a gradation target region) exists, then the process proceeds to STEP61. On the other hand, when there is no gradation target region, the process branches to STEP56, and terminates the process.

In STEP61, the indication control unit 11 performs the gradation process to the gradation target region. As the gradation process, the indication control unit 11 performs a process such as decreasing a contrast of the gradation target region, and decreases the luminance of pixels of the gradation target region having the luminance of a fixed level or more. Thereafter, the process proceeds to STEP56, and the indication control unit 11 terminates the process.

Figure 11A:
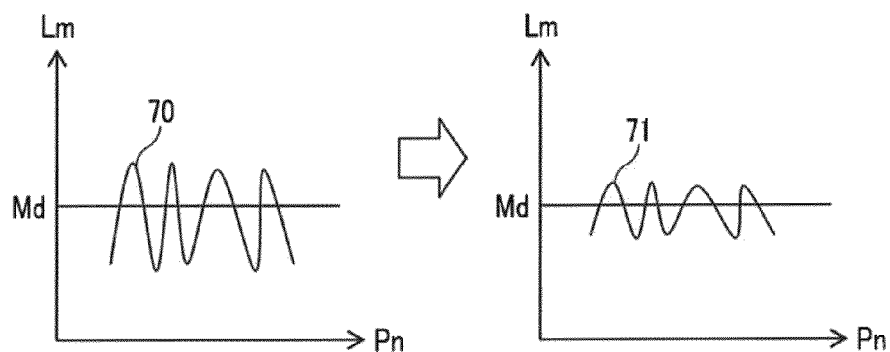
FIGS. 11A and 11B are explanatory views of a gradation process.
Figure 11B:
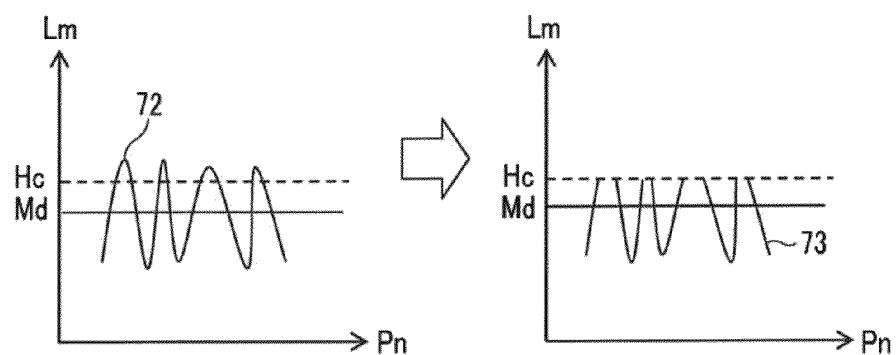

FIG. 11A is an explanatory view of the process of decreasing the contrast, and FIG. 11B is an explanatory view of the process of decreasing the pixels with the luminance of the fixed level or more.

First, a left side of FIG. 11A shows a luminance distribution 70 of the pixels in the gradation target region, by setting the axis of ordinate to luminance (Lm), and the axis of abscissas to number of each pixel in the gradation target region (Pn), where Md indicates an average value of luminance of each pixel.

Further, a right side of FIG. 11A shows a luminance distribution 71 in which a divergence degree from the average value Md is decreased from the luminance distribution 70 on the left side. As is explained above, by decreasing the divergence degree of the luminance of each pixel from the average value Md, it becomes possible to decrease the contrast of the gradation target region, and to decrease a luminance difference between the pixels in the gradation target region.

Subsequently, a left side of FIG. 11B shows a luminance distribution 72 of the pixels in the gradation target region, by setting the axis of ordinate to luminance (Lm), and the axis of abscissas to number of each pixel in the gradation target region (Pn), where Md indicates the average value of the luminance, and Hc indicates an upper limit value of luminance.

Further, a right side of FIG. 11B shows a luminance distribution 73, in which luminance of pixels exceeding the upper limit value Hc in the luminance distribution 72 on the left side are changed to the upper limit value Hc. As is explained above, by decreasing the luminance of the pixels exceeding the upper limit value Hc, it becomes possible to decrease the luminance difference between the pixels in the gradation target region.

The indication control unit 11 performs the gradation process to the captured image of the left-rearward camera 2L with the flowchart of FIG. 9, and thereafter indicates the same on the left-rearward indicator 3L. By doing so, it becomes possible to decrease the flickering of the screen of the left-rearward indicator 3L from the image portions of the power poles and street lamps aligned in the left side of the road on which the vehicle 1 is travelling, when the captured images of the time-series of the left-rearward camera 2L becomes the one in which the image portions of the power poles and roadside trees move (flow).

[Second Embodiment of Gradation Process]

Next, with reference to FIG. 12 and FIG. 13, explanation will be given on a second embodiment of the gradation process.

In the first embodiment, explanation is given on a case where the gradation process is performed in a situation where the power poles and street lamps are aligned with a predetermined interval therebetween at the left end of the road. In the second embodiment, explanation is given on a case where the gradation process is performed in a situation where the left side of the road is a plant population 80 in which vegetation is growing gregariously.

Figure 12:
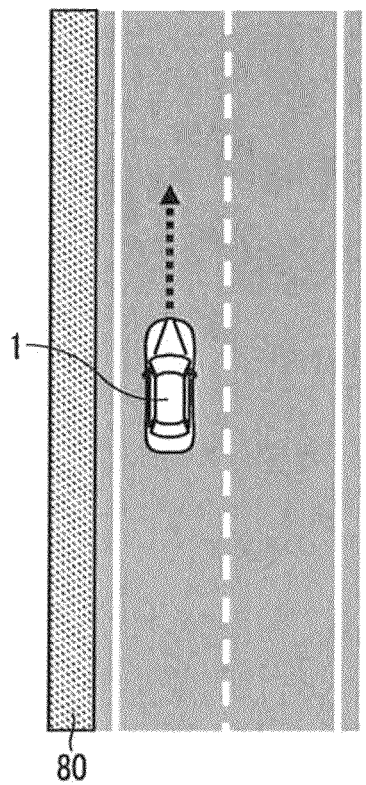
FIG. 12 is an explanatory view of a situation where plant population is continuing at the left end of the road on which the self-vehicle is traveling.

As is shown in FIG. 12, in a case where the left side of the road on which the vehicle 1 is traveling is the plant population 80, an image portion of the plant population 80 in the captured image of the left-rearward camera 2L changes the luminance in a short period, since the plant population 80 is made from various vegetation growing irregularly.

From the change of luminance in short period, the display screen of the left-rearward indicator 3L flickers, when the captured images of the left-rearward camera 2L are displayed on the left-rearward indicator 3L. Therefore, in order to decrease the flickering of the display screen of the left-rearward indicator 3L from the existence of such plant population 80, the indication control unit 11 performs the gradation process to the captured image of the left-rearward camera 2L.

Figure 13A:
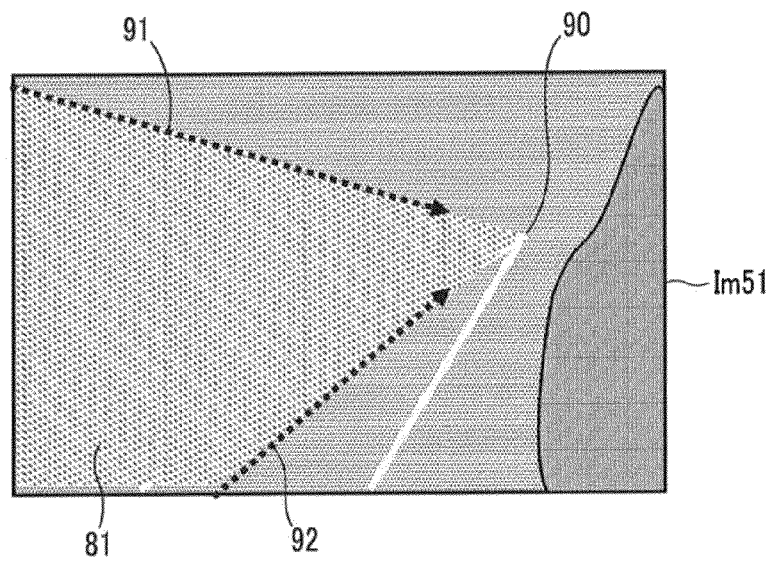
FIGS. 13A and 13B are explanatory views of a process of detecting luminance change of a captured image of the left-rearward camera, in the state shown in FIG. 7.

As is shown in FIG. 13A, the luminance change detecting unit 16 detects a portion 81 in which the pixels with the luminance changing in short period in the captured image Im51 of the left-rearward camera 2L is distributing towards a vanishing point 90 where the image of the road disappears at the rearward of the vehicle 1 (distributing in a direction of optical flows 91, 92). In this case, all of the captured image Im51 becomes the luminance detecting region.

The luminance change detecting unit 16 obtains the vanishing point 90 and the optical flows 91, 92, by performing an edge extraction process, a straight line extraction process and the like to the captured image Im51 of the left-rearward camera 2L, and recognizing the image portion of the road and the image portion of the plant population.

Thereafter, the indication control unit 11 performs the gradation process explained above, when the luminance change detecting unit 16 detects the distribution portion 81, to the distribution portion 81 or to the distribution portion 81 and surroundings portions thereof.

Thereafter, the luminance change detecting unit 16 performs such gradation process to the captured images of the left-rearward camera 2L, and displays the captured images performed with the gradation process to the left-rearward indicator 3L. By doing so, in a situation where the image portions of the plant population flow in the captured images of the left-rearward camera 2L, by the plant population existing in the left side of the road on which the vehicle 1 is traveling, it becomes possible to decrease the flickering of the screen of the left-rearward indicator 3L from the image portion.

A degree of the flickering of the display of the left-rearward indicator 3L differs from a proportion of a range of the image portion of the plant population occupying the captured image of the left-rearward camera 2L, and an impression of annoyance felt by the driver differs.

Figure 13B:
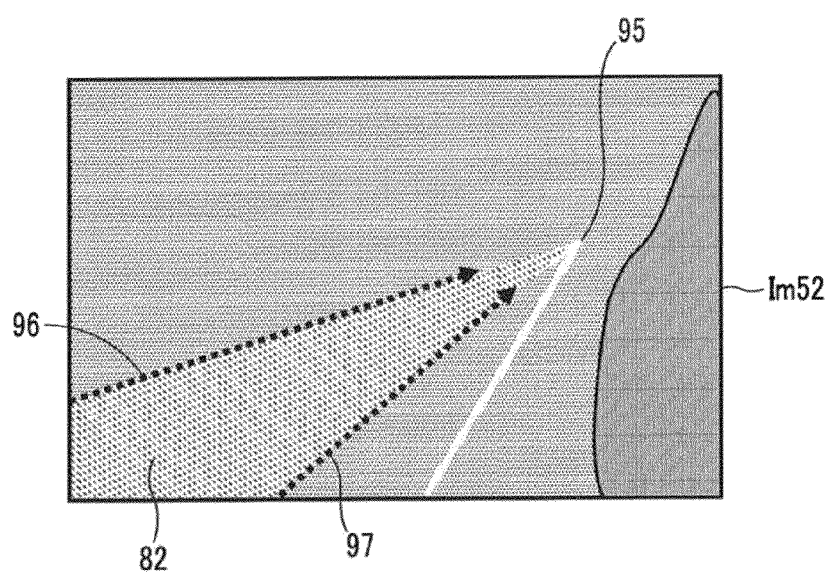

Therefore, as is shown in FIG. 13B, when the proportion of a range 82 of the image portion of the plant population occupying the captured image Im52 of the left-rearward camera 2L is small, the gradation process may not be performed. In the figure, 95 indicates the vanishing point in the captured image Im52, and 96, 97 indicate the optical flows of the image portion 82 of the plant population.

Alternatively, it may be set so that, according to the proportion of the range of the pixels with the luminance changing in the period within the determination period range to the total pixels of the captured image of the left-rearward camera 2L, the range performing the gradation process becomes wider, or a level of the gradation process becomes higher (decreases the contrast further, lowers the upper limit value of the luminance), as the proportion becomes higher.

By performing the gradation process limitedly as above, it becomes possible to reduce the calculation load of the indication control unit 11 from the gradation process.

In the present embodiment, in FIG. 9, the gradation process is performed in STEP51 limited to when the vehicle traveling on a road having a plurality of lanes is traveling on the leftmost lane, and the gradation process is performed in STEP60 limited to when a proportion of the pixels with the luminance changing periodically is equal to or more than a predetermined value. However, the effect of the present invention may be obtained even in a case where these limitations are not set.

Further in the present embodiment, the standard period is set according to the acceleration-deceleration of the vehicle, from STEP52 through STEP53 of FIG. 9. However, the standard period may be set without using the acceleration-deceleration.

INDUSTRIAL APPLICABILITY

As is explained above, according to the driving assistance device of the present invention, when displaying the side-rearward image of the self-vehicle with the guideline superimposed thereon to the indicator, it becomes possible to prevent the display of the guideline from being inappropriate to the driver, so that it is useful for assisting the driver.

REFERENCE SIGNS LIST

1 ... vehicle (self-vehicle), 2L ... left-rearward camera, 2R ... right-rearward camera, 3L ... left-rearward indicator, 3R ... right-rearward indicator, 10 ... driving assistance device, 11 ... indication control unit, 12 ... lane mark detecting unit, 13 ... road shape recognizing unit, 14 ... brightness detecting unit, 15 ... side-rearward object detecting unit, 16 ... luminance change detecting unit, 17 ... road situation detecting unit, 18 ... acceleration-deceleration detecting unit.

The invention claimed is:

1. A driving assistance device equipped with an indication control unit including an indicator mounted on a vehicle which displays an image of a side-rearward of the vehicle captured by a camera mounted on the vehicle with a guideline showing a guide of distance from the vehicle to an object in the image superimposed on the image, the driving assistance device comprising:
 a road shape recognizing unit which recognizes a shape of a road on which the vehicle is traveling;
 wherein, when it is recognized by the road shape recognizing unit that the shape of the road on which the vehicle is traveling is a shape of a curved road with a curvature equal to or more than a first predetermined value, or a shape of a road of a traveling path during a right-turn or a left-turn of an intersection, or a shape of a road with a gradient change rate equal to or more than a second predetermined value, the indication control unit sets the guideline to non-display or sets a indicating position of the guideline in line with the shape of the road recognized by the road shape recognizing unit.

2. The driving assistance device according to claim 1, further comprising a brightness detecting unit which detects a brightness of surroundings of the vehicle, and
 a side-rearward object detecting unit which detects an other vehicle existing at side-rearward of the vehicle, based on the captured image of the camera,
 wherein, when the brightness of the surroundings of the vehicle detected by the brightness detecting unit is equal to or less than a predetermined level, the indication control unit indicates the guideline only when the other vehicle is being detected by the side-rearward object detecting unit, and sets the guideline to non-display when the other vehicle is not being detected by the side-rearward object detecting unit.

3. The driving assistance device according to claim 1, further comprising a luminance change detecting unit which detects that a luminance of a luminance detecting region set so as to include an image portion of a road side is changing periodically, for a side-rearward image of the vehicle captured by the camera during traveling of the vehicle,
 wherein, when it is detected by the luminance change detecting unit that the luminance of the luminance detecting region is changing periodically, the indication control unit performs a gradation process of decreasing a luminance difference between pixels in the luminance detecting region to the image, and indicates the image performed with the gradation process to the indicator.

4. The driving assistance device according to claim 3, wherein the luminance detecting region is set to a shape in which a length in a first direction corresponding to a vertical direction of the vehicle is longer than a length in a second direction corresponding to a right and left direction of the vehicle.

5. The driving assistance device according to claim 3, wherein the indication control unit performs the gradation process, when the pixels with the luminance changing periodically within the luminance detecting region are distributed toward a vanishing point in which an image portion of the road vanishes in a direction corresponding to rearward of the vehicle.

6. The driving assistance device according to claim 3, further comprising a road situation detecting unit which detects a situation of the road on which the vehicle is traveling,
 wherein, when the vehicle is traveling on a road having a plurality of traffic lanes, the indication control unit performs the gradation process limited to a case where the vehicle is traveling on a leftmost or a rightmost traffic lane.

7. The driving assistance device according to claim 3, wherein the luminance change detecting unit detects whether or not the luminance is changing periodically for each pixel in the luminance detecting region, and
 the indication control unit performs the gradation process limited to a case where a proportion of the pixels in which the luminance is changing periodically to total pixels of the luminance detecting region is equal to or more than a predetermined value.

8. The driving assistance device according to claim 3, wherein the indication control unit performs, as the gradation process, a process of decreasing a contrast of the luminance detecting region, or changing a maximum luminance of each pixel in the luminance detecting region to equal to or less than a predetermined upper limit luminance.

9. The driving assistance device according to claim 1, further comprising an acceleration-deceleration detecting unit which detects an acceleration-deceleration of the vehicle,
 wherein the luminance change detecting unit sets a standard period for detecting that the luminance of the luminance detecting region is changing periodically, based on the acceleration-deceleration of the vehicle.

* * * * *